United States Patent Office 3,179,686
Patented Apr. 20, 1965

3,179,686
MIXED SULFITE ESTERS OF ALKYNYL ALCOHOLS AND GLYCOL ETHERS
Rupert A. Covey, Wolcott, Allen E. Smith, Oxford, and Winchester L. Hubbard, Woodbridge, Conn., assignors to United States Rubber Company, New York, N.Y., a corporation of New Jersey
No Drawing. Filed Dec. 19, 1962, Ser. No. 245,649
3 Claims. (Cl. 260—456)

This application is a continuation-in-part of our application Serial No. 131,741, filed August 16, 1961, and now abandoned.

This invention relates to new chemicals, namely new organic esters of sulfurous acid, more particularly to mixed sulfite esters of alkynyl alcohols and glycol ethers.

The new compounds of the present invention are useful as pesticides, more particularly herbicides and insecticides.

The chemicals of the present invention may be represented by the general formula

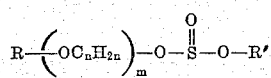

in which R is an aliphatic radical, e.g. alkyl, alkenyl, alkynyl, cycloalkyl, cyanoalkyl or haloalkyl radical; R' is an acyclic alkynyl radical; $n$ is 2 to 10, and $m$ is 1 to 10. Where $m$ is greater than 1, the repeating oxyalkyl groups may be the same or different. Examples of R are alkyls having up to 18 carbon atoms, e.g. methyl, ethyl, propyl, isopropyl, butyl, isobutyl, sec.-butyl, tert.-butyl, amyl, hexyl, 2-ethylhexyl, octyl, decyl, isodecyl, dodecyl, hexadecyl, octadecyl, allyl, methallyl, alkynyl radicals having 3 to 10 carbon atoms, e.g. propargyl and 1-(3-nonynyl), cyclohexyl, 2-cyanoethyl, chloroalkyls having up to 5 carbon atoms and up to 3 chloro radicals, e.g. 2-chloroethyl, 2,2,2-trichloroethyl, γ-chloropropyl, δ-chlorobutyl, ω-trichloroamyl. Examples of R' are acyclic alkynyl radicals having 3 to 10 carbon atoms, i.e. $C_nH_{2n-3}$— radicals where $n$ is 3 to 10, e.g. propargyl, 1-(3-butynyl), 2-(3-butynyl), 2-(2-methyl-3-butynyl), 1-(2-heptynyl), 1-(3-nonynyl). Examples of the —$OC_nH_{2n}$— group are ethyleneoxy, trimethyleneoxy, tetramethyleneoxy, propyleneoxy, isopropyleneoxy, 1,2-dimethylethyleneoxy, octamethyleneoxy.

The preparation of the chemicals of the invention may be carried out by reacting the selected alkynyl alcohol with the separately prepared chlorosulfinate of the selected glycol ether, which may be made by reacting the selected glycol ether with thionyl chloride. The glycol ether may be made by reacting the selected alcohol, with one to ten moles of the selected alkylene oxide per mole of the alcohol. Such preparation is illustrated by the following reactions with the same symbols R, R' and $m$ as in the above general formula and for convenience using ethylene oxide ($n=2$) as the alkylene oxide:

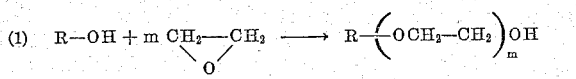

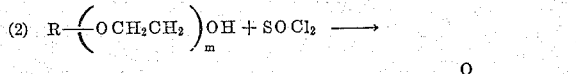

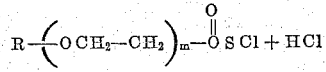

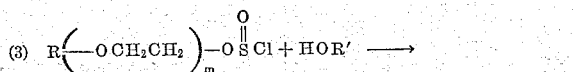

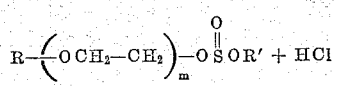

Reaction (1) above is a well known and smooth reaction giving a mixture of products having varying numbers of alkylene oxide units. If a compound with a specific number of alkylene oxide units is desired, the mixture may be fractionated. The following reaction of isopropyl alcohol with propylene oxide is illustrative of the well known preparation of the starting glycol ethers according to reaction (1) above.

Isopropyl alcohol (153 ml., 120 g., 2.0 moles) and 2.4 g. sodium hydroxide were combined and refluxed while 203 ml. (174 g., 3.0 moles) propylene oxide was added during six hours. The temperature of the refluxing solution at the end of the addition was 55° C. Refluxing was continued for eight hours more during which time the reflux temperature rose to 108° C. The mixture was distilled to give 52 g. (44%) isopropoxyisopropyl alcohol, B.P. 147–148° C., 29 g. (16%) diisopropoxyisopropyl alcohol, B.P. 113–127° C. (23 mm.), and 22 g. (9%) triisopropoxyisopropyl alcohol, B.P. 153–163° C. (22 mm.).

The preparation of the chlorosulfinates of the glycol ethers according to reaction (2) is carried out at a temperature of between −5° C. and 30° C., preferably near 0° C., and the yield of chlorosulfinate is nearly quantitative. An inert solvent such as benzene, xylene or solvent naphtha may be used. This is illustrated in Example I below.

The preparation of the sulfite esters is carried out in the presence of an HCl acceptor, such as pyridine, dimethyl aniline or trimethylamine, and in a solvent such as benzene, xylene or solvent naphtha. The reaction temperature is generally between −10° C. and 50° C., preferably near 0° C. This is illustrated in Example I below.

Examples of the sulfite diesters of the present invention are:

Propargyl methoxyethyl sulfite
Propargyl ethoxyethyl sulfite
Propargyl butoxyethyl sulfite
Propargyl tert.-butoxyethyl sulfite
Propargyl 2-ethylhexoxyethyl sulfite
Propargyl hexadecoxyethyl sulfite
Propargyl cyclohexoxyethyl sulfite
Propargyl 2-ethylhexoxyisopropyl sulfite
Propargyl allyloxyethyl sulfite
Propargyl propargyloxyethyl sulfite
Propargyl γ-chloropropoxyisopropyl sulfite
Propargyl β-cyanoethoxyethyl sulfite
Propargyl octoxyisopropoxyisopropyl sulfite
Propargyl decoxytetraisopropoxyisopropyl sulfite
Propargyl 3-isodecoxypropyl sulfite
2-(3-butynyl) octadecoxyisopropyl sulfite
1-(2-butynyl) 3-methoxy-2-butyl sulfite
1-(3-hexynyl) 1-butoxy-4-octyl sulfite
2-(2-methyl-3-butynyl) 4-isopropoxy-1-hexyl sulfite The following examples illustrate the invention. All parts and percentages referred to herein are by weight.

EXAMPLE I

*Preparation of propargyl isodecoxyethyl sulfite*

Isodecoxyethyl chlorosulfinate was prepared as illustrated in reaction (2) above as follows: thionyl chloride (45.4 ml., 74.4 g., 0.625 mole) was added dropwise during one hour to 101 g. (0.5 mole) isodecoxyethyl alcohol prepared according to reaction (1) as illustrated above and previously cooled to 0–5° C. The temperature during the addition was maintained below 5° C. The reaction mixture was allowed to warm to room temperature and stand for 15 hours. The mixture was warmed to 50° C. (0.35 mm.) in order to remove dissolved gases and excess thionyl chloride. Yield, 143 g. (100%).

Propargyl alcohol (3.2 ml., 3.1 g., 0.055 mole), 4.1 ml. (4.0 g., 0.05 mole) pyridine and 30 ml. xylene were combined and the solution cooled to 0–5° C. A solution of 14.2 g. (0.05 mole) isodecoxyethyl chlorosulfinate in 10 ml. xylene was added during 15 min. keeping the reaction temperature below 10° C. The mixture was stirred for 10 min. and was washed twice with 25 ml. portions of water. The mixture was then stirred for one hour with 50 ml. 2 N NaOH. The xylene solution was washed with 25 ml. portions of saturated salt solution until the washings were neutral to pH paper. The xylene was removed under reduced pressure and the residue distilled to give 8.5 g. (56% yield) of propargyl isodecoxyethyl sulfite,

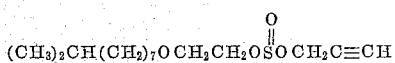

B.P. 130–140° C. (0.3 mm.).

*Analysis.*—Calculated for $C_{15}H_{28}O_4S$: S, 10.53. Found: S, 10.36, 10.50.

EXAMPLE II

*Preparation of 2-(3-butynyl)isopropoxyisopropoxyisopropyl sulfite*

Isopropoxyisopropoxyisopropyl chlorosulfinate was prepared as illustrated in reaction (2) above as follows: thionyl chloride (9.0 ml., 14.8 g., 0.125 mole) was added dropwise to 17.6 g. (0.1 mole) diisopropoxyisopropyl alcohol previously cooled to 0–5° C. The temperature during the addition was kept below 10° C. The mixture was stirred for two hours and then warmed to 30° C. (0.5 mm.) to remove dissolved gases and excess thionyl chloride. Yield, 24.0 g. (93%).

3-butyn-2-ol (3.9 g., 0.055 mole), 4.1 ml. (4.0 g., 0.05 mole) pyridine and 20 ml. xylene were combined and the solution cooled to 0–5° C. A solution of 12.9 g. (0.05 mole) of the above isopropoxyisopropoxyisopropyl chlorosulfinate in 30 ml. xylene was added during 30 min. keeping the reaction temperature below 10° C. The mixture was stirred for 15 min. and was washed twice with 25 ml. portions of water, once with 50 ml. 2 N NaOH and twice with 25 ml. portions of saturated salt solution (until neutral). The xylene was removed under reduced pressure and the residue distilled to give 12.0 g. (82% yield) of 2-(3-butynyl) isopropoxyisopropoxyisopropyl sulfite; B.P. 96–125° C. (0.08 mm.), $n_D^{25}$ 1.4214. *Analysis.*—Calculated for $C_{13}H_{24}O_5S$: S, 10.96. Found: S, 10.54, 10.73.

EXAMPLE III

This example illustrates the pre-emergence control of weeds.

To evaluate the chemicals of the invention as pre-emergent herbicides a measured amount (¼ teaspoon) of a mixture of weed seeds is spread evenly over the surface of a sandy-loam soil contained in a 6 inch pot. The weed seed mixture is made up of five broadleaved species, namely, pigweed (Amaranthus spp.), purslane (Portulaca spp.), quickweed (Galinsoga spp.), ragweed (Ambrosia spp.) and lambsquarters (Chenopodium spp.) and three grass types, namely crab grass (Digitaria spp.), barnyard grass (Echinochloa spp.) and foxtail (Setaria spp.). The seed is covered with ¼″ to ⅛″ of soil and the chemical dispersed in water is spread evenly over the soil surface. Application of 40 mg. of chemical per pot is equivalent to a rate of 20 lbs. per acre. The pots are placed in the greenhouse in 6 inch saucers and waterings are made from the bottom. Duplicate pots are run for each chemical and the effectiveness of the compound is determined three weeks later by estimating the percent kill of the weeds compared to the untreated check pots. The weed control at 20 lbs. per acre rate for broadleaved weeds was 95% for each of the chemicals of Examples I and II.

EXAMPLE IV

This example illustrates the post-emergence control of weeds.

To evaluate the chemicals of the invention as post-emergent herbicides a measured amount (¼ teaspoon) of the weed seed used in Example III is spread evenly over the surface of a rich sandy-loam soil contained in a 4″ x 4″ x 4″ box. The germinating seeds are maintained under a 16-hour light and an 8-hour dark exposure per 24-hour period and at a temperature of 75° F. for 10 days. At this time the broadleaved weed species are approximately 1½″ tall and the grassy weed species have leaves 4″ to 5″ long. Duplicate boxes of weeds are sprayed to runoff with aqueous dispersions of the chemicals at a concentration of 2000 parts per million, the aqueous dispersions containing a small amount, about 0.01%, of a surface-active dispersing agent which is a reaction product of ethylene oxide and an alkyl phenol. The effectiveness of the compounds is determined after 10 days by estimating the percent control of the weeds compared to the untreated check boxes. The chemical of Example I gave 98% control of both broadleaved weeds and grasses. The chemical of Example II gave 100% control of broadleaved weeds and 20% control of grasses.

EXAMPLE V

The following illustrates the insecticidal activity of the chemicals of the invention in tests against the larvae of *Aedes aegypti* (L.) mosquitoes. Fourth instar larvae were used. These larvae normally reach this stage in 5 days at 80° F. after hatching.

To 10 mgs. of each chemical to be tested was added 1 ml. of acetone and 100 ml. of water to give a concentration of 100 parts per million (p.p.m.).

Twenty-five ml. aliquots, replicated once, of each chemical to be tested at a concentration of 100 p.p.m. and of checks without the chemical and of plain water checks were placed in test tubes and from 5 to 25 larvae were added. The tubes were held at 70° F. in darkness for 72 hours. At the end of this period the live and dead larvae were counted and the percent mortality calculated. All the larvae were alive in the checks (0% mortality). The percent mortality of the larvae treated with the chemical of Example I was 100%. The percent mortality of the chemical of Example II was 83%.

The chemicals of the present invention may be applied to the soil or to plants as a dust in admixture with a powdered solid carrier, such as the various mineral silicates, e.g., mica, talc, pyrophyllite and clays, or as a spray in aqueous suspension or solution, preferably with the addition of a surface-active dispersing agent. The chemicals of the invention may be applied as an aqueous emulsion prepared by dissolving in a suitable solvent such as kerosene, fuel oil, diesel oil or xylene containing a surface-active dispersing agent, and adding such concentrate to water. Such surface-active dispersing agent may be anionic, non-ionic or cationic, as shown in U.S. Patent 2,556,665, columns 2 to 4. The chemicals of the invention may also be admixed with powdered solid carriers, such as mineral silicates, together with a small amount of such a surface-active dispersing agent so that a readily wettable powder may be obtained which may be applied directly to plants, or which may be shaken up with water, to readily prepare a suspension of the chemical (and powdered carrier) in water for application in that form.

Having thus described our invention, what we claim and desire to protect by Letters Patent is:

1. A chemical represented by the general formula

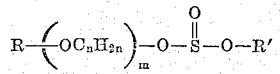

in which $n$ is 2 to 10, $m$ is 1 to 10, R is selected from the group consisting of alkyl having up to 18 carbon atoms, allyl, methallyl, alkynyl having 3 to 10 carbon atoms, cyclohexyl, cyanoethyl, and chloroalkyl having up to 5 carbon atoms and up to 3 chloro radicals, and R' is acyclic alkynyl of the formula $C_nH_{2n-3}$— where $n$ is 3 to 10.

2. Propargyl isodecoxyethyl sulfite.

3. 2 - (3 - butynyl) isopropoxyisopropoxyisopropyl sulfite.

References Cited by the Examiner
UNITED STATES PATENTS

| | | | |
|---|---|---|---|
| 2,802,727 | 8/57 | Harris et al. | 260—456 |
| 2,820,808 | 1/58 | Harris et al. | 260—456 |
| 2,885,278 | 5/59 | Brack | 260—456 X |
| 2,901,338 | 8/59 | Richter | 260—456 X |

CHARLES B. PARKER, *Primary Examiner.*